United States Patent
Quinn

[15] 3,668,243
[45] June 6, 1972

[54] DIFUNCTIONALLY TERMINATED POLYMERS AND METHODS OF THEIR PREPARATION

[72] Inventor: Edwin J. Quinn, Lancaster, Pa.
[73] Assignee: Uniroyal, Inc., New York, N.Y.
[22] Filed: Aug. 9, 1968
[21] Appl. No.: 751,350

[52] U.S. Cl. ..................260/535 R, 149/109, 260/475 R, 260/485 J, 260/533 R, 260/610 R
[51] Int. Cl. ..........................................C07c 59/18
[58] Field of Search.................................260/535

[56] References Cited
UNITED STATES PATENTS
2,754,325   7/1950   Smith.................................260/535 X OTHER PUBLICATIONS
Brown; N. et al., JACS 77, 1955, pp. 1756

*Primary Examiner*—Lorraine A. Weinberger
*Assistant Examiner*—Paul J. Killos
*Attorney*—Willard R. Sprowls

[57] ABSTRACT

Preparation of carboxy-hydroxy conjugated diolefin polymers useful in rocket fuel and for the production of alpha-omega dicarboxy conjugated diolefins.

6 Claims, No Drawings

DIFUNCTIONALLY TERMINATED POLYMERS AND METHODS OF THEIR PREPARATION

BACKGROUND OF THE INVENTION

This invention relates to new difunctional conjugated diolefin polymers and to methods of producing such compositions. More particularly the invention relates to carboxy-hydroxy conjugated diolefins and to their method of preparation.

It has been known to react cyclohexanone peroxide with conjugated diolefins in the presence of ferrous ions to yield long chain dicarboxylic acids. If the normal reaction mechanisms of peroxides reacting with conjugated diolefins in the presence of ferrous ions are applied to cyclohexanone peroxide, one would expect that only omega-hexanoic acid free-radicals will be formed. It now has been found that under certain conditions hydroxy free-radicals are formed from cyclohexanone peroxide during emulsion polymerization of conjugated diolefins.

SUMMARY OF THE INVENTION

A feature of the present invention is that by using cyclohexanone peroxide in combination with conjugated diolefins at temperatures in the range from about 5° to 60° C. a hydroxy-carboxy conjugated diolefin polymer product is obtained. Cyclohexanone and peroxide may be used in place of cyclohexanone peroxide. The presence of cyclohexanone is essential to the formation of the carboxy functionality, and if only peroxide is used an alpha-omega dihydroxy polymer is produced. When cyclohexanone peroxide is used, however, cyclohexanone is not required to produce the carboxy functionality.

Liquid polymer resulting from the reaction of cyclohexanone peroxide with conjugated diolefins under the procedure of the instant invention contains an average of 1.0 to 1.8 hydroxy groups per molecule and 1.0 to 0.2 carboxylic acid end groups.

The compositions of the instant invention have found use as rocket fuel binders, and as a "flexible backbone" for further graft polymerization. Whereas the prior art produced only the tetramer of conjugated diolefins, i.e., a degree of polymerization with a maximum of four, the instant composition has a degree of polymerization with a minimum of ten. This high polymer provides relatively high molecular weight compositions which can readily be used in rocket fuels.

It is another feature of the present invention that lower, more practicable temperatures may be used than when hydrogen peroxide is used alone in the production of difunctionally terminated polymers.

Thus it is an object of the present invention to provide new polymer products, namely hydroxy-carboxy terminated polymers.

Another object of this invention is to provide a carboxy-hydroxy terminated polymer having a degree of polymerization greater than four.

It is a further object of this invention to provide a new process for the synthesis of hydroxy-carboxy terminated polymers as intermediates useful for the production of dicarboxy polymers.

Other objects and advantages will become more apparent to those skilled in the art from the following description.

DESCRIPTION OF PREFERRED EMBODIMENTS

Carboxy-hydroxy terminated polymers may be prepared using standard emulsion polymerization techniques. The reactants may all be present initially or certain of the components may be added incrementally or continuously during reaction.

Monomers consisting of conjugated diethylenic compounds which can be treated with the peroxide system to produce the carboxy-hydroxy terminated polymer are, for example: 1,3-butadiene, isoprene, 2,3-dimethyl-1,3-butadiene and various other conjugated diolefins. Mixtures of two monomers may also be utilized in the practice of this invention.

The catalyst system used for the polymerization consists of a cycloalkanone peroxide activated with ferrous ion. "Luperox 6," a product of Lucidol Division, Wallace & Tiernan, Inc., Buffalo, New York is technical bis-(1-hydroxycyclohexyl) peroxide, otherwise known as cyclohexanone peroxide, having 90.0 percent minimum activity, and an active oxygen content of 6.25 percent. This product may be conveniently used as a source of cyclohexanone peroxide.

Cyclohexanone peroxide can also be prepared from cyclohexanone and hydrogen peroxide, but it has been found that "Luperox 6" may replace such a mixture. Thus providing an economical catalyst while forming the same polymeric material.

The "Luperox 6" catalyst concentration can be varied from 0.1 to 26.4 phm. (Parts per 100 parts of monomer), with solid polymer formation generally resulting below the 4.0 phm. level, while liquid polymer at room temperature is prepared at the levels above this concentration. Concentrations of 10.0 to 14.4 phm. are preferred.

Use of cyclohexanone peroxide with a monomer, such as butadiene, produces a difunctionally terminated polymer. The number of functional end groups or functionality of the polymer is 2. However, in practice the value differs from 2 due to slight errors in analysis of the end groups and molecular weights. Also, if the chain should terminate by a mechanism such as, hydrogen abstraction, not requiring reaction of the function-bearing free radical, then the functionality is less than 2. The polymers produced using this invention have a total functionality approaching 2. Generally the hydroxy functionality varies from 0.5 to 1.8 while the acid functionality varies from 0.4 to 0.1.

The acid functionality may be increased by using a disulfide compound having carboxy groups, such as, 2,2'-dithiodiglycolic acid or similar aliphatic dithio acids, as a chain terminator. The dithio acid concentration may vary from one to five phm., with two to three parts being preferred. This chain terminator may be added incrementally or continuously during the polymerization. If it is present initially inhibition of polymerization may occur. Use of these terminators raises the acid functionality to approximately one, while the hydroxy functionality is reduced to one. Sulfur analysis shows that as much as 95 percent of the acid present is from the dithio terminator.

Various emulsifiers may be used with this polymerization system to aid the speed of the reaction. Examples are: cationics, such as, cetyl dimethyl benzyl ammonium chloride, anionics, such as oleic acid soaps, and nonionics, such as isocotyl phenyl polyethoxy ethanols and ethylene oxide — propylene oxide condensates, etc. The levels of emulsifiers used ranged from 1.0 to 6.0 phm. Generally, the level used was 3.5 phm. with the cationic, Ammonyx T, (cetyl dimethyl benzyl ammonium chloride) being the preferred emulsifier. High levels of nonionic emulsifiers while suitable for polymerization tend to cause difficulties in isolation of the liquid product.

The reaction is conducted in the presence of a heavy metal ion. Examples of such suitable metal ions are ferrous, cuprous, cobaltous, etc. It has been found that the ferrous ion is the most useful. The heavy metals are preferably employed in amounts varying from 0.1 to 4.0 equivalents with 0.2 to 0.4 being the normal value.

The reaction between the peroxide and the conjugated unsaturated monomer may be effected in water, solvents, or emulsions. The reaction may be carried out in the presence of common solvents, such as benzene or tetrahydrofuran or mixtures of these solvents with water.

Temperatures employed in the reaction between the peroxide and the conjugated unsaturated monomer may vary over a considerable range, but are generally maintained between 5° and 60° C. Pressures used may be atmospheric or super-atmospheric. Generally, it is desirable to operate at higher pressures, such as for example, when it is desired to maintain relatively volatile solvents in the liquid phase. Normally, the polymerization reaction is conducted in a closed container and the pressure that develops is caused by butadiene reaction and vaporization at the reaction temperature.

Time of reaction may vary considerably, such as, from four hours to twenty-eight hours. In practice, the polymerization is normally shortstopped at the end of a definite time period, such as, 15 hours.

In order to disclose more clearly the nature of the present invention, specific examples of the practice of the invention are hereinafter given. It should be understood, however, that this is done solely by way of example and is intended neither to delineate the scope of the invention nor to limit the ambit of the appended claims.

EXAMPLE 1

Into a 20-gallon polymerization autoclave equipped with a mechanical stirrer, external heating coils, and a pressure and temperature recorder are placed: Ammonyx T (cetyl dimethyl benzyl ammonium chloride) (6 phm., 8.4 pounds, 25 percent active) and Luperox 6 (13.2 phm., 4.6 pounds) dissolved in 26.7 pounds of water. Ferrous sulfate heptahydrate (0.6 phm., 0.21 pounds) is dissolved in 5 pounds of water and charged into the vessel. An additional 25 pounds of water are added to bring the total water level to 180 phm. Butadiene (100 parts, 35 pounds) is charged, and the vessel is vented three times. The temperature is raised to 132° F. A small sample of the polymerization mixture is withdrawn every hour, and the percent solids (by weight) of the sample is determined. In five hours the batch attains 15.5 percent solids at a temperature of 132° C. and a pressure of 90 psi. (pounds per square inch).

The reaction mixture is shortstopped with hydroxylamine sulfate (0.22 pounds, 0.7 phm.) and then cooled. Addition of the shortstop causes the emulsion to break and a liquid polymer layer forms on top of the aqueous layer. The aqueous layer is discarded, and the polymer layer is then washed several times with water. The final product, carboxyhydroxy terminated polybutadiene, was a slightly viscous, clear dark brown liquid. Its physical properties are listed in Table 1.

EXAMPLE 2

Into a 5-gallon polymerization autoclave equipped with a mechanical stirrer, external heating coils, and a pressure and temperature recorder are placed: Ammonyx T (3.5 phm., 1.38 pounds, 25 percent active) and Luperox 6 (13.2 phm., 1.30 pounds) dissolved in 4 pounds of water. Ferrous sulfate heptahydrate (0.8 phm., 0.08 pounds) is dissolved in one pound of water and charged into the autoclave. Additional water is added so that the total amount present, including that added with the chain terminator, will total 180 parts. Butadiene (100 parts, 9.9 pounds) is charged and the vessel is vented three times. Temperature is raised to 132° F. Terminator solution consisting of 2,2'-dithiodiglycolic acid (5.0 phm., 0.5 pounds) dissolved in 1 pound of water is prepared. This is added to the polymerization vessel in ten equal portions with one portion being added at the end of each hour of polymerization.

The reaction mixture is shortstopped after 16 hours of polymerization with hydroxylamine sulfate (0.6 phm., 0.06 pounds) and then cooled. After flocculation the aqueous layer is discarded. The polymer layer is washed several times with water and dried with heating under reduced pressure. The final product, carboxy-hydroxy terminated polybutadiene, was a fluid, clear dark brown liquid. Further properties are shown in Table 1.

EXAMPLE 3

Using the same procedure as Example 1, the polymerization vessel was charged with Ammonyx T (3.5 parts, 5.6 pounds), Luperox 6 (4.4 parts, 1.75 pounds), 2,2'-dithiodiglycolic acid (0.86 parts, 0.26 pounds), ferrous sulfate heptahydrate (0.80 parts, 0.32 pounds) and water (180 parts, 54.0 pounds). The temperature was raised to 132° F. A solution was prepared consisting of Luperox 6 (8.8 parts, 3.5 pounds), 2,2'-dithiodiglycolic acid (1.14 parts, 0.54 pounds) and tetrahydrofuran (60 parts, 24.0 pounds). This solution was then added continuously to the heated reaction mixture over a period of 15 hours. Total polymerization time was 20.5 hours.

The polymerization was shortstopped with hydroxylamine sulfate (1.1 parts, 0.33 pounds). The final product, carboxy-hydroxy terminated polybutadiene, was a clear dark brown fluid. Other properties are shown in Table 1.

TABLE 1

Physical Properties of Carboxy-Hydroxy Terminated Polymers

| Example | 1 | 2 | 3 |
|---|---|---|---|
| Acid, equiv./100 g. | 0.017 | 0.064 | 0.028 |
| Hydroxyl, equiv./100 g. | 0.080 | 0.086 | 0.077 |
| $M_n{}^a$, vapor pressure osmometry | 2000 | 1530 | 1900 |
| $IV^b$, benzene, 30° C. | 0.20 | 0.11 | 0.17 |
| % Sulfur | Nil | 1.80 | 1.66 |

$^a M_n$ = number average molecular weight
$^b IV$ = intrinsic viscosity

| Example | 1 | 2 | 3 |
|---|---|---|---|
| Infrared Sprectra | | | |
| % cis | 12 | 18 | 8 |
| % Trans | 68 | 65 | 71 |
| % Vinyl | 21 | 17 | 21 |
| Functionality, total | 1.94 | 2.29 | 1.99 |
| Due to COOH | 0.34 | 0.98 | 0.53 |
| Due to OH | 1.60 | 1.31 | 1.46 |

Preparation of α-ω-Dicarboxy Terminated Polybutadienes

α-ω-Dicarboxy polybutadienes may be prepared by reacting with an acid anhydride, the carboxy-hydroxy polybutadienes produced according to the procedure of Examples 1–3. All hydroxy end groups are converted to carboxylic acids and thus form an internal ester bond near one end of the polymer chain. The resultant polymers have the general formula:

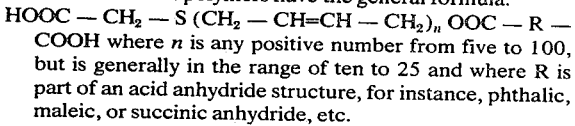

HOOC — CH$_2$ — S (CH$_2$ — CH=CH — CH$_2$)$_n$ OOC — R — COOH where $n$ is any positive number from five to 100, but is generally in the range of ten to 25 and where R is part of an acid anhydride structure, for instance, phthalic, maleic, or succinic anhydride, etc.

The general reaction consists of reacting the appropriate carboxy-hydroxy polymer with the acid anhydride in a suitable solvent. The mixture is refluxed for several hours, and the solvent is removed by evaporation. The polymeric material is washed several times and is finally dried, yielding the desired dicarboxy terminated polymer.

Suitable anhydrides for use in this process include phthalic, maleic, and succinic, with succinic anhydride being preferred because fewer side reactions occur with the saturated structure. The reaction may be carried out in the presence of a solvent, such as benzene, toluene, or pyridine, with benzene preferred. Its lower reflux temperature decreases the chance of gel formation during the esterification reaction and it is more readily removed during washing and drying. The reaction mixture may be washed to remove any unreacted anhydride or acid that may have formed by anhydride hydrolysis. Suitable solutions for use in the wash step include: hot and cold water, aqueous 1 percent sodium hydroxide, aqueous solutions of calcium acetate and hydroxide and one percent hydrochloric acid solution.

EXAMPLE 4

Carboxy-hydroxypolybutadiene (250 g.) is placed in a 1 liter, 3 neck R. B. Flask equipped with a mechanical stirrer, reflux condenser, thermometer, and having an external heating system. Benzene (700 ml., 615 g.) and succinic anhydride (30 g.) are added with stirring. The mixture is heated to reflux temperature, 83°–85° C., and is held there for 6 hours.

The benzene solution is cooled and washed four times with hot water. Benzene and water are removed by heating under reduced pressure to obtain the final product, dicarboxy polybutadiene, a clear dark brown liquid. Other properties are shown in Table 2.

TABLE 2

Dicarboxy Polybutadiene

| Analysis | Carboxy Hydroxy Polybutadiene | Succinic Anhydride Reaction Product |
| --- | --- | --- |
| Acid, equiv./100 g. | 0.017 | 0.089 |
| Hydroxyl, equiv./100 g. | 0.017 | Nil |
| mg KOH/1 g. | 60.3 | Nil |
| $M_n$, vapor pressure osmometry | 1630 | 1932 |
| Carboxy Functionality | 0.26 | 1.72 |
| Hydroxy Functionality | 1.64 | 0 |

Cure Studies of $\alpha$-$\omega$-Dicarboxy Polybutadiene

EXAMPLE 5

A general cure recipe consists of polymer 100 parts and tris (1-(2-methyl)aziridinyl) phosphine oxide (MAPO) 2 to 30 parts per one hundred parts of polymer. The MAPO curative amount is generally used at 1.0 to 2.0 equivalents per equivalent of acid contained in the polymer. Time of cure may vary from 12 to 64 hours. Temperature of cure may range from 170° to 325° F. A specific recipe is polymer 100 parts and MAPO 20.1 parts (equal to 1.2 equivalents of MAPO per 1.0 equivalents of acid in polymer) cured for 48 hours at 170° F.

Typical cure properties using the above recipe would be 9.0 psi. tensile strength at 475 percent elongation and 9.6 psi. at 488 percent elongation.

The terms and expressions which have been employed are used as terms of description and not of limitation and there is no intention in the use of such terms and expressions of excluding any equivalence of the features shown and described or portions thereof, but it is recognized that various modifications are possible within the scope of the invention claimed.

Having thus described my invention, what I claim and desire to protect by Letters Patent is:

1. A method for preparing a hydroxy-carboxy terminated polymer comprising
    a. dissolving bis-(1 hydroxy cyclohexyl peroxide) together with a metal salt selected from the group consisting of ferrous, cuprous and cobaltous and an emulsifying agent in a solvent;
    b. adding a conjugated diolefin; and
    c. heating to about 5 to about 60° C. for 4 to 28 hours at a pressure of up to 250 pounds per square inch absolute.

2. The method of claim 1 wherein said solvent is selected from a group consisting of water, benzene, tetrahydrofuran and a mixture of any of these.

3. The method of claim 1 wherein said emulsifying agent is selected from the group consisting of cetyl dimethyl benzyl ammonium chloride, oleic acid soaps, isocetyl phenyl polyethoxy ethanols, and ethylene oxide-propylene oxide condensates.

4. The method of claim 1 wherein said conjugated diolefin is selected from the group consisting of isoprene, 1,3-butadiene, and 2,3-dimethyl-1,3-butadiene.

5. The method of claim 1 wherein a mixture of cyclohexanone and hydrogen peroxide is used for preparing in situ bis-(1-hydroxy cyclohexyl peroxide).

6. $\alpha,\omega$-hydroxycarboxy-polybutadiene of a number molecular weight of from about 1,500 to about 2,000.

* * * * *